Figure 1:
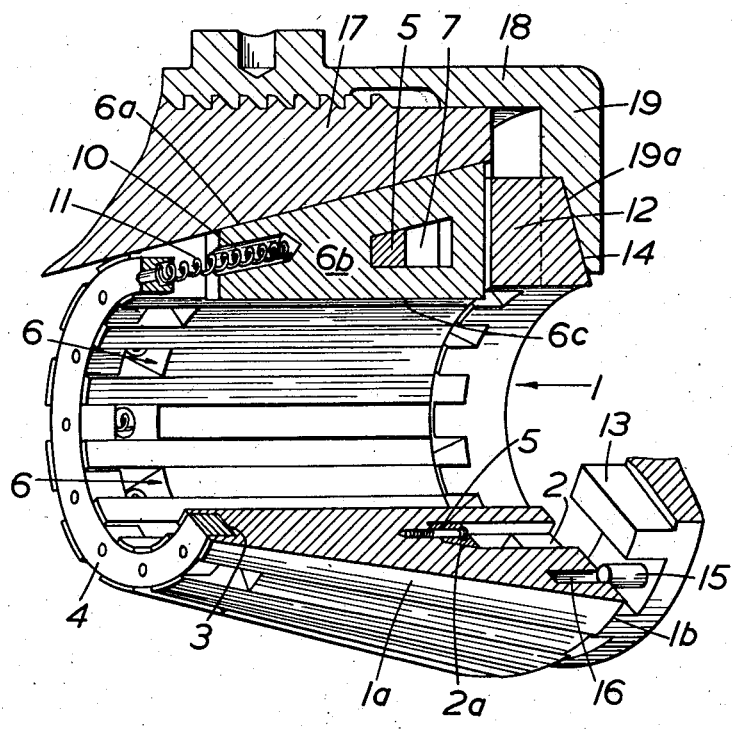

Dec. 2, 1958   D. E. STAINTON   2,862,718
COLLETTS

Filed April 4, 1955   3 Sheets-Sheet 1

Dudley E. Stainton Inventor
By Cushman, Darby & Cushman
Attorneys

Dec. 2, 1958 D. E. STAINTON 2,862,718
COLLETTS

Filed April 4, 1955 3 Sheets-Sheet 2

United States Patent Office 2,862,718
Patented Dec. 2, 1958

2,862,718

COLLETS

Dudley Ernest Stainton, Rickmansworth, England, assignor to National Research Development Corporation, London, England, a corporation of Great Britain Application April 4, 1955, Serial No. 499,098

18 Claims. (Cl. 279—59)

This invention relates to collets and collet chucks and particularly to improved constructions of collets for such chucks and methods of making them. By the term collet is meant one of a series of sleeve-like components, each of which is designed to accommodate a different range of work size and is adapted for use with a collet chuck for the purpose of allowing work of the appropriate size to be passed through and accommodated in the chuck, and each component incorporates gripping members adapted to be actuated by means associated with the chuck so as to be brought into gripping engagement with the work.

It is an object of this invention to provide a collet component for use in a collet chuck, the component including movable work engaging members which when moved radially into gripping engagement with a workpiece will effectively grip the workpiece and exert a substantially parallel and evenly distributed concentric gripping pressure over the whole of that part of the length of the workpiece which they engage.

To this end, according to the invention, a collet adapted for use with a collet chuck comprises an annularly shaped cage-like body formed by a plurality of interdependent rigid segmental members disposed relatively to one another so as to provide therebetween a number of spaced guideways disposed circumferentially around a central work receiving space extending longitudinally of the cage, and a plurality of separate movable gripping members located in said guideways so as to be slidable radially therein with respect to the cage-like body, the gripping members being retained in their guideways so as to form therewith a unitary collet assembly, the cage-like body having a conically shaped peripheral portion which is adapted to engage a complementarily coned body, associated with the chuck, which coned body is also caused to act upon the gripping members as relative sliding movement occurs between the coned surfaces thereof and the coned body to cause said gripping members to move radially and in unison into gripping relation with the work.

The gripping members may be arranged so that under the action of said complementarily coned body they slide in unison longitudinally within said guideways whilst at the same time executing the radial movement. At all positions over the full range of movement of the gripping members, the work engaging portions formed thereon are maintained parallel to one another and therefore one collet may be employed to grip work of varying diameters within limits, e. g. throughout a range of ⅛ inch.

The collet preferably comprises a fixed cage formed of a plurality of spaced segments interdependent on one another to define clear spaces therebetween, the segments being held fast in position by means of retainer rings. Any suitable means may be provided for urging the gripping members in unison so as to cause them simultaneously to move radially with respect to the fixed cage and chuck body.

Figure 1A:
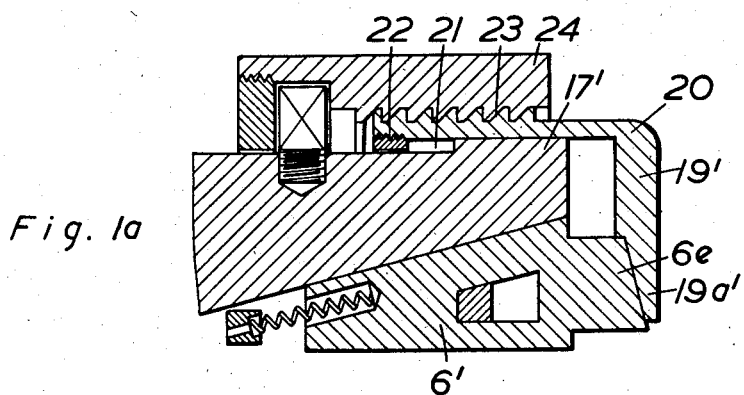
Figure 2:
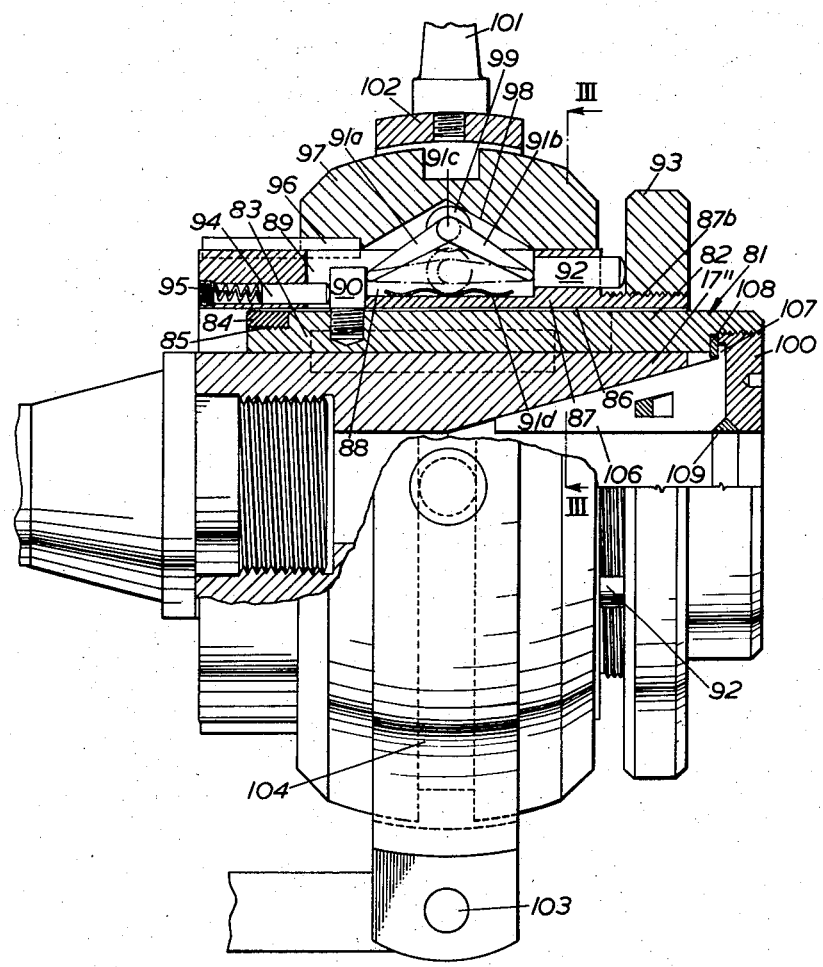
Figure 3:
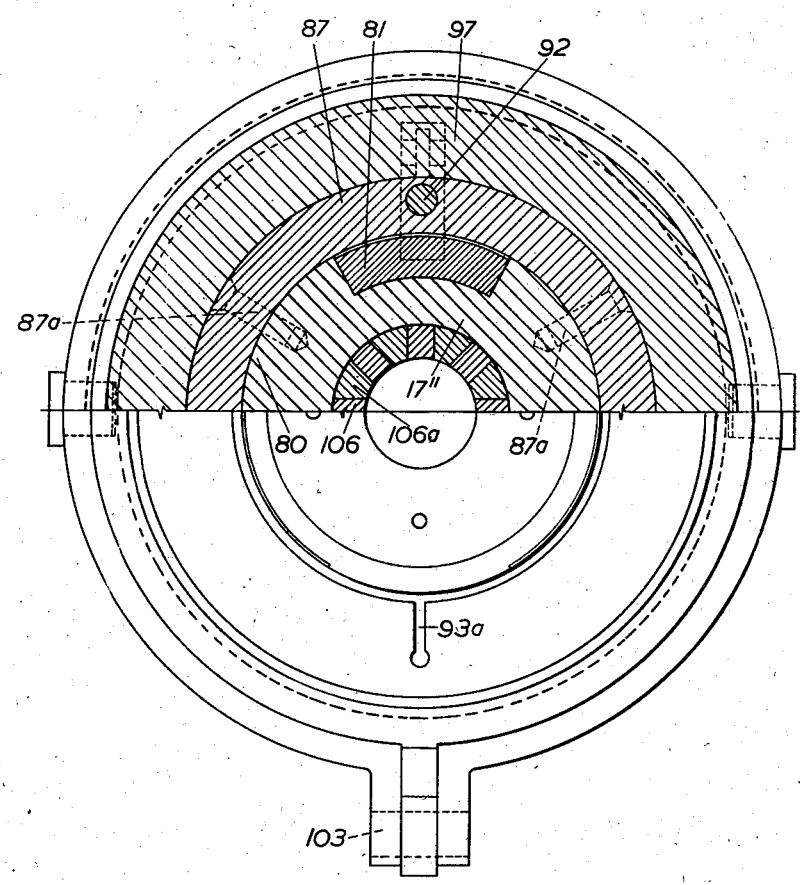
Figure 4:
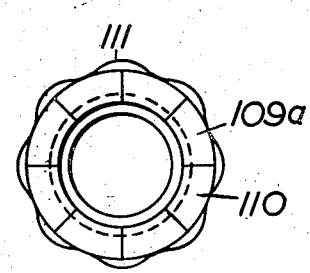

In order that the invention may be more clearly understood several embodiments will now be described by way of example together with divers ways of bringing the gripping members of the collets into engagement with the workpiece. In the following description reference will be made to the accompanying drawings in which Fig. 1 is a sectional perspective of one form of a collet embodying the invention together with its associated operating mechanism; Fig. 1a is a part sectional elevation of the collet shown in Fig. 1 but having a modified operating mechanism; Figs. 2 and 3 are side and end elevations of a toggle operated collet chuck and a modified form of collet mounted therein for operation; Fig. 4 is a view of a swarf ring for the collet.

Referring firstly to Fig. 1 of the accompanying drawings, the cage 1 is formed by a plurality of members or so-called segments 1a, e. g. of steel, which are approximately sector shaped in cross-section and taper along their length. These are formed from a short frustoconical body having a central bore therethrough as by being drilled axially. An annular recess 2 having a short tapered portion as shown at 2a is formed in the large, or front, end of the body and an annular recess 3 at the small, or back, end of the body. The body is then longitudinally slot milled through radially at equidistantly spaced positions circumferentially thus dividing the body into twelve equally spaced apart segments 1a. The segments 1a are held in spaced relationship with one another around a central work-receiving space by so called retainer rings, viz. ring 4 fitting into the back annular recess 3 and a two-piece diametrically split ring 5 having a tapered portion on its outer periphery fitting into the tapered portion 2a of the front annular recess 2. The two rings 4 and 5 also link the segments 1a to form the cage-like body.

Gripping members 6 are accommodated in the intermediate spaces between the segments 1a of the cage 1 so that they can slide relatively between the segments 1a in both a radial and a longitudinal direction with respect to the cage 1. Each gripping member 6 is wedge-shaped as shown and has one outer tapering edge 6a which conforms substantially to the taper of the cage 1 formed by the segments 1a; the flanks 6b of each gripping member 6 when in position lie adjacent to the flanks of the segments 1a and the larger end face of the wedge lies approximately adjacent the front edge 1b of the segment assembly or cage 1. The face 6c of each wedge-shaped gripping member 6 opposite the tapered face 6a thereof constitutes a work engaging jaw portion and takes up a position slightly projecting into the bore of the segment assembly 1 when the jaws are at their position of maximum opening at which position they are shown in Fig. 1. In order that the gripping members 6 may be retained in their position between the segments 1, each is provided with an aperture as at 7 through which the two halves of the diametrically split retainer ring 5 can be threaded. Each aperture 7 is wedge-shaped and is a little larger than the section of the split retainer ring 5 so that the desired relative sliding movement can take place between gripping members 6 and the split retainer ring 5. Thus, in the assembly of the collet, the members 6 may be withdrawn from an initial location within the assembly of segments 1a sufficient to thread the the two halves of the split ring 5 through the apertures 7 and the split ring 5 with gripping members 6 linked thereby is then pressed home in the annular recess 2 in the larger end of the segment assembly. The split retainer ring 5 then anchors the individual segments 1a; retaining them together in firm formation as a cage.

Screws or, if desired, induction welds may be used to secure the split ring 5 and also the back ring 4 to each of the segments 1a where the surfaces of these members abut against one another. The rear ends of the gripping members 6 are each provided with a hole 10 for housing means associated with the cage-like body including a return spring 11 which acts against the back ring 4 and tends to keep each of the gripping members 6 in the open or expanded position by urging them radially outwards, as shown, with the small end of the tapered aperture 7 in each of the gripping members 6 seating against the tapered split ring 5. Hence endwise pressure on the front ends of the gripping members 6 will tend to push them longitudinally of the axis of the collet against the action of the return springs 11, and each gripping member 6 in its longitudinal movement will be guided to move radially inwards between two adjacent segments by the relative sliding between the aperture 7 in each gripping member 6 and the tapered split ring 5 fixedly secured to the segments. On release of such endwise pressure the return springs 11 serve to return the gripping members 6 to their original position, the gripping members 6 thus moving radially outwards whilst making their short return longitudinal movement.

In order to provide means of applying endwise pressure on to the individual front end faces of the gripping members 6, a pressure plate 12 being a part of the collet chuck is applied to the front end of the collet. This plate is in the form of a ring which has one face exhibiting projections 13 and its opposite face 14 provided with an outwardly coned surface. Extending from the plate 12 at positions intermediate the projections 13 are a number of dowels 15 which enter an equivalent number of holes 16 drilled in the front faces of certain of the segments 1a, the dowels 15 being slidable within the holes 16 and thus locating the projections 13 relatively to the front ends of the gripping members 6 so that they may be brought to abut against the gripping members 6 to urge the latter uniformly against the return springs 11.

In operation, the improved collet, i. e. the cage comprising the assembly of segments 1a, gripping members 6 and pressure plate 14 is applied into the hardened and ground cone of the chuck body 17. The gripping members 6 are operated towards the rear or small end of the body by rotation of a cap nut 18 screwed on to an outer portion of the chuck body 17 and having a projecting flange 19, an internally tapered portion 19a of which engages over the coned face of the pressure plate 14. Rearward movement of the gripping members 6, which may be ground to a small radius on both the outside and inside contacting edges, viz. at 6a and 6c where these engage respectively the chuck body cone 17 and the workpiece (not shown) permits the members 6 to close concentrically inwards radially, the members 6 sliding in the guideways defined by the interleaving segments 1a. The pressure of gripping on to a workpiece, e. g. a round bar (not shown), will be automatically ensured through the contact which the outer edges 6a of the gripping members 6 make along the inner tapered wall of the coned chuck body 17. The work engaging portions 6c, of the gripping members 6 will give parallel closing throughout the whole range of each collet. On release of the endwise pressure exerted by the cap nut 18, the return springs 10 will operate the gripping members 6 towards the front, or large diameter end of the body 17 and thus open the collet.

An alternative means of imparting endwise or longitudinal movement to the gripping members 6 which may be employed is shown in Fig. 1a and in this figure the segments forming the cage of the collet are omitted for the sake of clarity. In this construction the pressure plate of the chuck is dispensed with and each gripping member of the collet as at 6' is extended forwards from the front face of the collet so that when positioned in a chuck body 17' a projecting portion of each gripping member 6'; shaped as shown at 6e is capable of co-operating directly with a tapered portion 19a' of a flange 19', of a sleeve 20. The sleeve 20 is a sliding fit on an outer cylindrical portion of the chuck body 17', with a keyway 21 engaged by a key 22 formed on the sleeve 20 so as to stop the latter from rotating. In this construction a thread 23 is formed on the outside diameter of the sleeve 20 and a closing nut 24 thread will engage it, the nut 24 itself being restrained from longitudinal movement; thus the sleeve 20 will not rotate when the nut 24 is turned, but will slide inwards and move the gripping members 6' down the tapered wall of the chuck body 17'.

In a further modified form of operating a collet according to the invention, the gripping members of the collet are adapted to be moved in their guideways by means of a lever operated toggle mechanism. A suitable form of such mechanism is shown in sectional elevation and cross-section in Figs. 2 and 3 respectively, Fig. 3 being shown in section along a line III—III in Fig. 2.

The selection of toggle mechanism as a means of operating the collet involves a modified form of body cone 17" having splines 80 of short length situated at 120° around its outer diameter. Within the clearances, or splineways, between the splines 80 is slidably mounted a complementary splined sleeve 81 which has a tubular portion 82 and a splined, or tongued, portion 83 extending rearwardly. The rearward extremities of the tongued portion are joined by a screwed ring 84 which engages an external screw thread 85 formed on the ends of the tongues. The outer diameter of the splined sleeve 81 is such that when it is mounted on the body cone 17", there is a small clearance 86 between it and an outer sleeve 87. The sleeve 87 is a fixed member, a portion of which encloses the open sides of the splineways defined between the splines of the portion 83 and which bears upon the outside diameter of the splines as shown. Countersunk screws 87a are employed to secure the fixed sleeve member 87 to the splines 80 of the body cone 17". The sleeve member 87 has three recesses as at 88, each accommodating one of a group of toggle mechanisms disposed at equal spacings around the sleeve member and, adjacent each of such recesses, the member 87 is slotted through as at 89 so that pins 90 fixed in the tongues 83 of the slidable member 81 may project through into the recesses and so to co-operate with the links 91a, 91b of the toggle mechanisms the pivots of which are as at 91c. The link 91b of each toggle device or mechanism abuts against one end of an adjustable pin 92 housed in a hole formed through part of the sleeve 87. A forward extension of the fixed sleeve 87 is screw threaded at 87b and carries a split locking adjusting nut 93 against which the other ends of the pins 92 abut.

The locking adjusting nut 93 is of a known type and comprises a nut split through at one portion of its periphery and partially split as 93a at one or more further portions of its periphery. On either side of and adjacent to the split through portion, a boss is formed. Each boss (not shown) is drilled and tapped to take a bolt and nut fastening means, capable of closing the split in the nut and thus contracting the nut 93 into firm engagement with the threaded portion 87b. When the fastening means is slack and the nut 93 consequently loose upon the threaded portion 87b, the nut 93 can be rotated and hence moved longitudinally with respect to the sleeve 87. This longitudinal movement serves as an adjustment for the effective range of movement of the toggle by causing simultaneous adjustment of the relative positions of the pins 92 in their holes which positions in turn determine the positions of the abutments for the levers 91b of the toggle mechanisms. The positions of the abutments for the levers 91b determine the distance of travel of the end of the other toggle lever 91a when the toggle mechanism is operated and hence the extent of movement imparted to the sliding member 81.

The toggle members 91a, 91b co-operating with the projections 90 of the sleeve 82 work against abutments afforded by pins 94, urged thereagainst by springs 95 located in bores in the rear end of the fixed sleeve 87.

An upper rear portion of the sleeve 87 is feather-keyed at 96 to a cam ring 97. The cam ring 97 has an inclined annular cam surface 98 which co-operates with a roller 99 mounted at the pivot 91c of the toggle links 91a, 91b of each toggle mechanism so that axial movement of the cam ring 97 causes relative movement between the roller 99 and the cam which is effective to press the toggle pivot inwards radially into its recess 88 tending to bring the toggle links 91a and 91b into alignment with one another. The pins 90 are thereby moved axially carrying with them sliding member 81 and through a thrust closing ring 100, movement is imparted to the gripping members or jaws 106 of the collet. The latter, being of a construction generally as shown in Fig. 1, provides a cage-like body with a plurality of guideways, defined by circumferentially spaced segments 106a, for gripping members 106. The cam ring 97 is operated by means of a lever 101 provided on a yoke member 102 which is pivoted at 103 on a suitable part of the lathe or the like and having shoes to engage a groove 104 in the outer periphery of the cam ring 97. By this means the gripping members 106 are simultaneously moved towards the rear of the chuck and as they move longitudinally in their guideways they are guided so as to move radially inwards by virtue of contact of their outer faces with the inner coned surface of the body cone 17''. In order to provide for effective release of the gripping members 106 each of these members is provided with a small extension 107 extending laterally and engaging in a recess, with a small degree of clearance, formed between the rear face of the thrust closing ring 100 and the forward face of a withdrawing washer 108 held in position by the thrust closing ring against a shoulder on the sleeve member 81. Thus when the toggle links 91a, 91b are released initially from their aligned position under the action of a leaf spring 91d, the sliding member 81 is urged to the right by means of the abutment and spring means 94, 95. The sliding member 81 engages, through the withdrawing washer 108, the gripping member projections 107 and as the gripping members slide forward longitudinally over the cone surface of the body cone 17'', the projections 107 extend further and further into the recess.

In order to prevent the entry of the swarf into movable parts of the collet a swarf ring may be fitted between the front of the collet and the thrust ring 100. To enable a swarf sealing ring to be fitted the front of each blade 106 is chamfered peripherally and a similar chamfer is formed on the ring 100 of the chuck. The swarf ring itself may consist of a ring of rubber or other suitable material as shown at 109 inserted into the space formed by the chamfered portions of the collet. Alternatively, the front ring 100 may be recessed at the side nearest the gripping members to take a segmental ring 110 (Fig. 4) being a ring formed by a number of segments of rigid material, held together at its inner diameter a rubber ring 109a fitting, in dovetail fashion the inner periphery of the ring. The segments of the ring 110 are put into slight initial compression by means of a surrounding wavy circlet spring 111 which provides a yielding pressure on the segments, so holding the rubber ring 109a in a swarf excluding position. The segments and also the inner rubber ring 109a may be rubber bonded together, the bonding being between the adjacent faces of the segments and the rubber ring.

Instead of forming the collet segments (as for example the segments 1a of Fig. 1) in the manner described above, they may be moulded from a synthetic plastic material, a similar form of cage-like body being built up from such segments of synthetic plastic material.

Also, the gripping members of the collet may have their work-engaging surfaces either plain or thread-like according to whether the work piece which they are to hold is or is not threaded on its surface.

I claim:

1. A collet adapted for use with a conical actuating surface of a chuck and capable of being readily disassociated from said chuck as an integral unitary collet so as to allow other similar collets of different sizes to be substituted in the chuck and comprising an annularly shaped cage-like body having a central throughway work receiving space extending axially of said cage-like body, said body being formed by a plurality of inter-dependent rigid segmental members disposed relatively to one another so as to provide therebetween guideways extending longitudinally of said body and disposed circumferentially around said throughway work receiving space, a plurality of gripping members located within said guideways so as to be slidable radially therein with respect to said cage-like body and the said throughway axially extending work receiving space, spring means associated with said cage-like body tending to urge said gripping members radially outwards away from said throughway work receiving space and so away from their gripping positions, and rigid retaining means fastened to said cage-like body for limiting the extent of the radially outward sliding movement of said gripping members under the force of said spring means and positively holding said cage-like body and gripping means together into a unitary collet assembly.

2. A collet as claimed in claim 1, in which the gripping members and the rigid segmental members are each apertured, and comprising a split retaining ring which constitutes the said means for slidably retaining the gripping members and positively holding them to the cage-like body, said split ring extending through the apertures in said gripping members so as to link the interleaved gripping members and segmental members together as a unitary collet forming assembly.

3. A collet as claimed in claim 1, in which the annularly shaped cage-like body is formed by the said plurality of annularly spaced segmental members formed integrally with an annular member as a moulded member of synthetic plastic material.

4. A collet comprising the combination into a unitary assembly of a plurality of rigid segmental members with longitudinally tapered outer surfaces, means for retaining said members in spaced relationship to form an annular cage, gripping members with longitudinally tapered outer surfaces and parallel inner gripping faces, said gripping members being located in guideways formed by spaces between the segmental members of the cage and slidable both axially and radially of said cage, with the outer surfaces of the cage and gripping members together forming a frusto-conical surface, spring means for urging said gripping members longitudinally along said cage and radially outwardly towards the larger end of the cone, and means for retaining the gripping members in said guideways by linking the gripping members and said segmental members together as a unitary assembly, the said gripping members projecting axially at the larger end of the cone to present faces which can be pushed axially inward against the force of said spring means.

5. A collet as claimed in claim 4 having an annular groove at its front end and including a swarf sealing ring lying at least partly in said groove, said ring comprising a segmental ring of rigid material, a ring of resilient material held thereby, and a circlet spring member surrounding and initially compressing the segments of said segmental ring.

6. A collet in combination with operating mechanism therefor, said collet comprising an annularly shaped cage-like body having a central throughway work receiving space therein extending axially of said cage-like body, said cage-like body being formed by a plurality of interdependent rigid segmental members disposed relatively to one another so as to provide therebetween guideways extending longitudinally of said cage-like body and disposed circumferentially around said work receiving space, a plurality of movable gripping members located within said guideways so as to be slidable radially therein with respect to said cage-like body, outer faces of said gripping members being shaped to form part of a coned surface, and retaining means for slidably retaining said gripping members in their guideways and linking said gripping members and said segmental members thereby to form a unitary collet assembly having an outer coned surface, said operating mechanism including a chuck body, a portion of said chuck body having a coned actuating surface of a conicity complementary to the aforesaid coned surface, means for locating said cage-like body in said chuck body with the two said coned surfaces adjacent one another, a toggle device having toggle levers, mounted within said chuck body with said toggle levers of said device lying longitudinally of said conical actuating surface of said portion of the chuck body, a slidable sleeve mounted on said chuck body through which movement of said toggles is transmitted to actuate said collet, by causing relative longitudinal movement to occur between said collet and the coned portion of said chuck body and so constraining the gripping members of said collet into gripping relation with the work.

7. The combination of a collet and operating mechanism therefor as claimed in claim 6, having a plurality of toggle devices, means for locating said devices within the chuck body at spaced positions therearound with the toggle levers thereof arranged longitudinally thereof, a cam ring for operating said toggle devices, means for supporting said cam ring in positon around said chuck body so that it can be moved relatively thereto to operate the toggle devices in unison.

8. The combination of a collet and operating mechanism therefor, as claimed in claim 6, having adjustable means for altering the position of one abutment of one toggle lever so as to vary the throw of the toggle device, the other toggle lever cooperating with a sliding sleeve transmitting operative movement to the collet against a spring.

9. The combination of a collet and operating mechanism therefor, as claimed in claim 6, including means for preventing the ingress of swarf into the collet when the latter is supported in said mechanism, the swarf excluding means comprising a flexible ring, and means defining a recess adjacent the work receiving space in said collet for retaining said flexible ring during operation of said mechanism.

10. A collet comprising an annularly shaped cage-like body having a central throughway work receiving space therein extending axially of said cage-like body, said body being formed of a plurality of interdependent rigid segmental members disposed relatively to one another so as to provide therebetween means defining guideways extending longitudinally of said body and disposed circumferentially around said work-receiving space, a plurality of movable gripping members located within said guideways so as to be slidable radially therein with respect to said cage-like body, the outer surface of the cage and gripping members together forming a coned surface, means for slidably retaining said gripping members within said guideways thereby to form a unitary collet assembly with said gripping members each having a forward portion thereof extending beyond one end of said cage-like body, a radially outwardly extending lug on each of said projecting end portions adapted to cooperate with mechanism to effect longitudinal sliding movement of said gripping members, and in combination with said collet mechanism for operating it which includes a chuck body, a portion of said chuck body having a coned actuating surface, means for locating said collet assembly within said chuck body with the coned surfaces of said portion of the chuck body and of said cage-like body and gripping members adjacent one another with said forward portions of said gripping members projecting from said coned actuating surface of said chuck, a slidable sleeve mounted on said chuck body, an annular plate extending from the forward end of said slidable sleeve and enclosing an annular portion of the forward end of the chuck, means associated with said slidable sleeve and said annular plate for engaging said lugs on the forward portions of said gripping members, a toggle device operative to impart longitudinal movement to said slidable sleeve in one given direction, spring means for imparting longitudinal movement thereto in an opposite direction whereby the gripping members are constrained through the inter-engagement of said lugs and slidable sleeve to move longitudinally of the coned body and guided by the coned portion of the chuck body into and out of gripping relation with the work.

11. A collet in combination with operating mechanism therefor as claimed in claim 10, having a plurality of toggle devices, means for locating said toggle devices within the chuck body with the toggle levers arranged longitudinally thereof, a cam ring for effecting operations of said toggle devices, means for pivotally supporting said cam ring in a position around said chuck body so that it can be moved relatively thereto to operate the toggle devices in unison.

12. A collet in combination with operating mechanism therefor as claimed in claim 10, having adjustable means for altering the position of one abutment of one lever of each of the toggle devices so as to vary the throw of the toggle device, the other toggle lever of said toggle devices cooperating with the slidable sleeve transmitting operative movement to the gripping members into work engaging relation with the work, spring means acting on said slidable sleeve to effect, when said toggle devices are released, longitudinal movement of the sleeve so as to bring the gripping members out of gripping relation with the work.

13. A collet which can be inserted in and removed from a collet chuck as in integral unit and comprising in combination a plurality of rigid segmental elements disposed around an axis and accordingly defining and partly enclosing an axially extending work-receiving space, a plurality of segmental gripping members also disposed around said axis with parallel work-gripping faces movable radially into said work-receiving space by sliding in guideways between and bounded by said first-mentioned rigid segmental elements, and a plurality of axially spaced rings rigidly uniting said first-mentioned segmental elements into a rigid annular structure, at least one of said rings being linked with said gripping members to constitute retaining means for holding the gripping members and said structure together as a unitary collet assembly.

14. A collet, as claimed in claim 13, wherein said retaining ring has a conical outer surface and is threaded through apertures in said gripping members which are longer than the width of the ring and have their radially outer boundary faces inclined to engage and fit the said conical surface of the retaining ring, the gripping members having a limited movement in a path which, by virtue of the said shaping of the ring and the apertures, is both axial and inclined radially inwardly.

15. A collet which can be inserted in and removed from a chuck as an integral unit comprising in combination a rigid annular structure defining a central work-receiving space extending along the axis of said structure and shaped to define a plurality of guideways disposed around said axis and opening into the said space, a plurality of segmental gripping members slidably fitting in said guideways, dimensioned to be free to make a limited sliding movement axially along the structure and radially into said space, means for guiding said gripping members each along a path inclined to said axis, rigid retaining means in the region of one end of said structure for holding the gripping members and said structure together as a unitary collet assembly, spring means urging said gripping members axially of said structure and outwardly from said axis into engagement with said retaining means, and projecting ends on said gripping members jutting out beyond said end of said structure to expose faces which can be pushed axially inwards to move said gripping members against the force of said spring means and into said central space.

16. A collet as claimed in claim 15, wherein said retaining means and said guiding means are constituted by the combination of a ring around said structure having a coned outer surface, with an engaging and complementarily shaped part on each of said gripping members.

17. A collet chuck comprising in combination a hollow chuck body, means defining an interior coned surface within said body around the axis of the chuck, a plurality of circumferentially spaced gripping members disposed in a ring around the inside of said coned surface, their inner gripping faces being parallel to the said axis and their outer faces shaped to be a sliding fit on said coned surface, means for effecting relative axial movement between said coned surface and all said gripping members together, the said inner and parallel gripping faces closing in towards each other and retracting while remaining parallel, by virtue of the sliding engagement of said outer faces and said coned surface, a rigid hollow annular structure enveloped by said coned surface and having parts lying between said gripping members to define guideways in which said gripping members have a sliding fit, means retaining said structure in the said chuck body, and rigid retaining means holding said structure and said gripping members together in a single unitary collet assembly when they are removed from said chuck body.

18. A collet chuck comprising a collet assembly having an externally coned surface tapering from front to rear, said assembly comprising firstly a rigid hollow annular cage-like structure shaped to define axial guideways disposed around the axis of the said structure, secondly a plurality of axially and radially extending gripping members slidably fitting in said guideways with freedom to more radially and axially, their radially inner gripping faces being parallel to the said axis, their outer faces forming part of said coned surface, and their front ends projecting beyond the front end of said structure, and thirdly an externally coned retaining ring on said structure linked with said gripping members to hold them and the structure together as a unitary collet assembly, in combination with a hollow chuck body, a sleeve therein internally coned to fit said collet assembly which is removably inserted in said sleeve, a removable actuator axially reciprocable in said body and a ring on the front of said actuator engaging said projecting ends of the gripping members to move them all together axially in the said guideways, the said inner parallel gripping faces closing in towards each other and retracting while remaining parallel by virtue of the sliding of each gripping member between the coned inner surface of said sleeve and the coned outer surface of said retaining ring.

References Cited in the file of this patent

UNITED STATES PATENTS

| | | |
|---|---|---|
| 506,024 | Whitlock | Oct. 3, 1893 |
| 1,488,001 | Clare | Mar. 25, 1924 |
| 1,520,883 | Pfunder | Dec. 30, 1924 |
| 2,536,519 | Stoner et al. | Jan. 2, 1951 |
| 2,654,611 | Lee | Oct. 6, 1953 |